United States Patent [19]
Tremblay

[11] Patent Number: 5,778,247
[45] Date of Patent: Jul. 7, 1998

[54] MULTI-PIPELINE MICROPROCESSOR WITH DATA PRECISION MODE INDICATOR

[75] Inventor: Marc Tremblay, Palo Alto, Calif.

[73] Assignee: Sun Microsystems, Inc., Palo Alto, Calif.

[21] Appl. No.: 612,623

[22] Filed: Mar. 6, 1996

[51] Int. Cl.[6] .................................................. G06F 9/38
[52] U.S. Cl. ........................ 395/800.23; 395/563; 395/389
[58] Field of Search .......................... 395/800.23, 800.24, 395/389, 563; 364/748

[56] References Cited

U.S. PATENT DOCUMENTS

| | | | |
|---|---|---|---|
| 4,476,537 | 10/1984 | Blau et al. | 364/748.16 |
| 4,755,965 | 7/1988 | Mary et al. | 395/556 |
| 4,823,260 | 4/1989 | Imel et al. | 395/563 |
| 5,488,709 | 1/1996 | Vegesna et al. | 395/800.23 |
| 5,515,520 | 5/1996 | Hatta et al. | 364/754.01 |
| 5,681,125 | 10/1997 | Witt et al. | 395/394 |

OTHER PUBLICATIONS

Molner et al "A HOMNZ 64-Bit Floating Point Co-Processor" IEEE, 1989.

*Primary Examiner*—Larry D. Donaghue
*Attorney, Agent, or Firm*—Townsend and Townsend and Crew LLP

[57] ABSTRACT

The present invention recognizes that for most functional units, there will rarely be both single and double precision operations in the pipeline at the same time. Accordingly, the present invention eliminates logic for checking whether a register designation is single or double precision for these functional units. Instead, a mode indicator is set to indicate whether the outstanding instructions in the pipeline are single or double precision. If a rare change in precision occurs, the instruction will not be dispatched until the pipeline is empty. The data dependency check logic can thus compare the register designations without knowing whether they are single or double precision.

19 Claims, 5 Drawing Sheets

MULTI-PIPELINE MICROPROCESSOR WITH DATA PRECISION MODE INDICATOR

BACKGROUND

The present invention relates to mechanisms for determining data dependencies in multiple function unit, pipelined microprocessors, in particular where both single and double precision registers use the same register file.

Microprocessors perform operations and arithmetic in an integer format or in a floating point format. Floating point instructions, which include a fixed part and an exponent, are sometimes handled in a separate floating point coprocessor, or the floating point operations may be performed on the microprocessor itself.

Either integer or floating point operands may be single precision, double precision or quad precision. For example, one single precision format is 32 bits, with a double precision format being 64 bits. Oftentimes, a single register file is used that is 64 bits wide. When storing single precision data, two pieces of data can be stored on each line. For double precision, on the other hand, a single piece of data is stored on each line. The register designations can thus overlap depending upon the mode used.

In a multiple-functional unit, pipelined processor, a dispatch unit will dispatch instructions to the appropriate functional units. Before doing so, it will check data and control dependencies to determine if the new instruction to be dispatched requires the same register being used by one of the outstanding instructions. This checking is complicated by the fact that the register designations may overlap and mean different things depending upon whether they are associated with a single precision or double precision number.

Accordingly, it would be desirable to simplify the data dependency logic in the dispatch logic without impairing performance.

SUMMARY OF THE INVENTION

The present invention recognizes that for most functional units, there will rarely be both single and double precision operations in the pipeline at the same time. Accordingly, the present invention eliminates logic for checking whether a register designation is single or double precision for these functional units. Instead, a mode indicator is set to indicate whether the outstanding instructions in the pipeline are single or double precision. If a rare change in precision occurs, the instruction will not be dispatched until the pipeline is empty. The data dependency check logic can thus compare the register designations without knowing whether they are single or double precision.

In one embodiment, functional units which may have a more frequent alternation between single and double precision are provided with the logic for distinguishing between the two, with the results provided to the data dependency check logic in the dispatch unit. In particular, a load/store functional unit is provided with this logic since alternation between single and double precision occurs more frequently in operations using the load/store functional unit.

In a further embodiment of the invention, a completion unit can be bypassed without providing logic for checking whether the respective register designations are for single or double precision. This is possible since the mode indicator prevents a mixture of single and double precision in the functional units pipelines in the first place, thus eliminating the need for this additional logic. Such logic is provided, however, for the load/store unit.

In a preferred embodiment, a two-bit register is used to indicate the mode. A first bit indicates either single or double precision. A second bit indicates whether the pipeline is empty. In one embodiment, a single mode indicator is used for all the functional units except the load/store unit. In one embodiment, the mode indicator must transition to the empty state before a switch between single and double precision is allowed. This restriction allows higher clock speeds by not limiting the cycle by the time required to do the calculation on a switch. There is little penalty since switches between single and double precision rarely occur in other than the load/store functional unit.

For a further understanding of the nature and advantages of the invention, reference should be made to the following description taken in conjunction with the accompanying drawings.

DETAILED DESCRIPTION OF THE PREFERRED EMBODIMENTS

Figure 1:
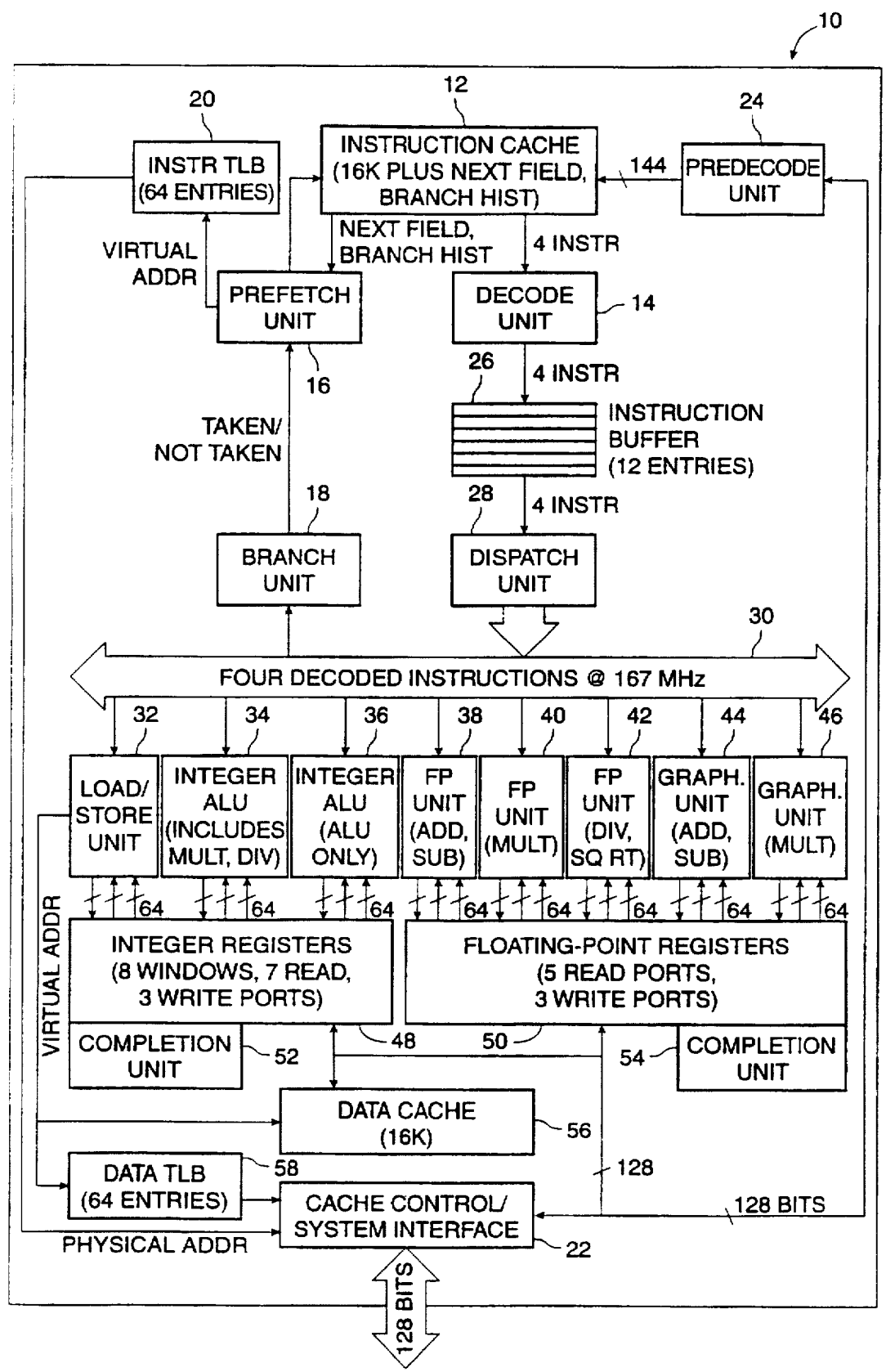
FIG. 1 is a block diagram of an embodiment of a microprocessor incorporating the present invention.

FIG. 1 is a block diagram of an UltraSparc™ microprocessor incorporating the present invention. An instruction cache 12 provides instructions to a decode unit 14. The instruction cache can receive its instructions from a prefetch unit 16, which either receives instructions from branch unit 18 or provides a virtual address to an instruction translation look-aside buffer (TLB) 20, which then causes the instructions to be fetched from an off-chip cache through a cache control/system interface 22. The instructions from the off-chip cache are provided to a pre-decode unit 24 to provide certain information, such as whether it is a branch instruction, to instruction cache 12.

Instructions from decode unit 14 are provided to an instruction buffer 26 (multiple buffers in parallel may be used), where they are accessed by dispatch unit 28. Dispatch unit 28 will provide four decoded instructions at a time along a bus 30, each instruction being provided to one of eight functional units 32–46. The dispatch unit will dispatch four such instructions each cycle, subject to checking for data and control dependencies and structural hazards (such as the availability of the proper functional unit and any required memory port).

The first three functional units, the load/store unit 32 and the two integer ALU units 34 and 36, share a set of integer registers 48. Floating-point registers 50 are shared by floating point units 38, 40 and 42 and graphical units 44 and 46. Each of the integer and floating point functional unit groups have a corresponding completion unit, 52 and 54, respectively. The microprocessor also includes an on-chip data cache 56 and a data TLB 58.

Figure 2:
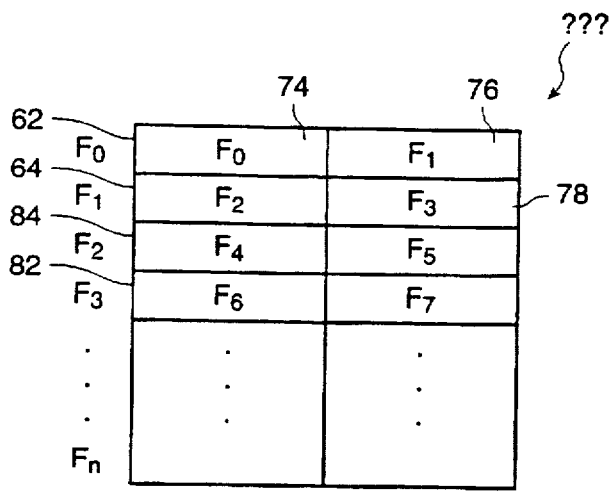
FIG. 2 is a diagram of a register file holding both single and double precision data.

FIG. 2 illustrates a register file 60. A first line 62 is designated in the double precision mode as register F0, while in the single precision mode it contains two register designations, F0 and F1. Similarly, a second entry 64 is designated as double precision register F1, while it has single precision register designations F2 and F3. As can be seen, without knowing whether the precision is single or double, a reference, for instance, to register "F1" can be two different locations.

Figure 3A:
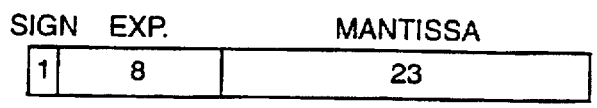
FIGS. 3A and 3B illustrate single and double precision data formats.
Figure 3B:

FIGS. 3A and 3B illustrate the format of single and double precision floating point numbers. As can be seen, the single precision in FIG. 3A requires 32 bits, and would take up half of an entry in register file 60, while the double precision number of FIG. 3B takes up 64 bits and would require an entire line of register file 60.

Figure 4A:
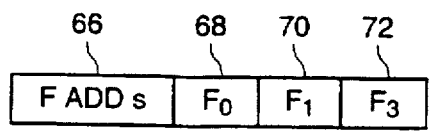
FIGS. 4A and 4B illustrate single and double precision instruction formats.

FIG. 4A illustrates an instruction format. An OP code 66 indicates that it is a floating point ADD and the "s" at the end indicates that it is single precision. The operands used by the instructions are indicated by register designations 68 and 70, which refer to registers F0 and F1. A destination register is indicated by designation 72, referring to a register F3. Since this is a single precision operand, as indicated by the OP code, the F0 designation refers to the single precision F0 position 74 in FIG. 2, the F1 refers to position 76 and the F3 designation refers to position 78, which is the second half of line 64 in register file 60 of FIG. 2.

Figure 4B:
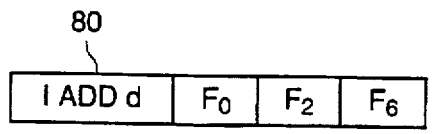

FIG. 4B illustrates a different instruction in which OP code 80 indicates an integer ADD that is double precision. The register designations of F0 and F2 for the operand registers and F6 for the destination register are thus double precision designations. F0 refers to line 12 in register file 60 of FIG. 2, thus intersecting single precision F0 and F1. Similarly, F2 refers to entry 64 in FIG. 2, and F6 refers to entry 82, both of which would collide with two separate single precision registers.

As can be seen, it is thus necessary to determine whether the register designation corresponds to a single or double precision OP code in order to determine data dependencies. In determining a data dependency for a new instruction of FIG. 4B, if FIG. 4A is outstanding, the writing of the complete result into F3 must occur before the instruction of FIG. 4B can access its register F1, since they use the same entry line as indicated in FIG. 2.

Figure 5:
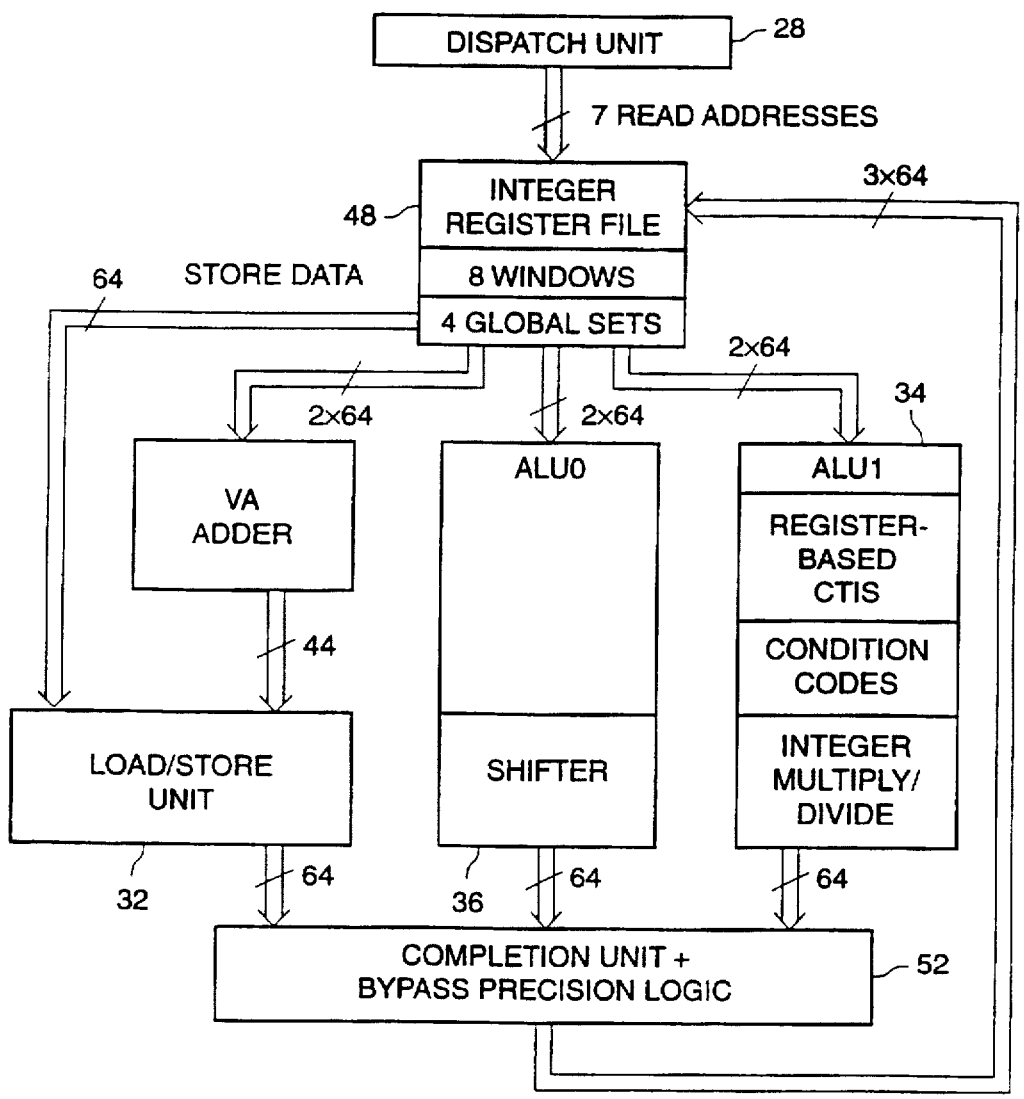
FIG. 5 is a block diagram of the integer and execution units of FIG. 1.

FIG. 5 illustrates a portion of the microprocessor of FIG. 1 in more detail. In particular, load/store unit 32 is shown and functional units 36 and 34.

Figure 6:
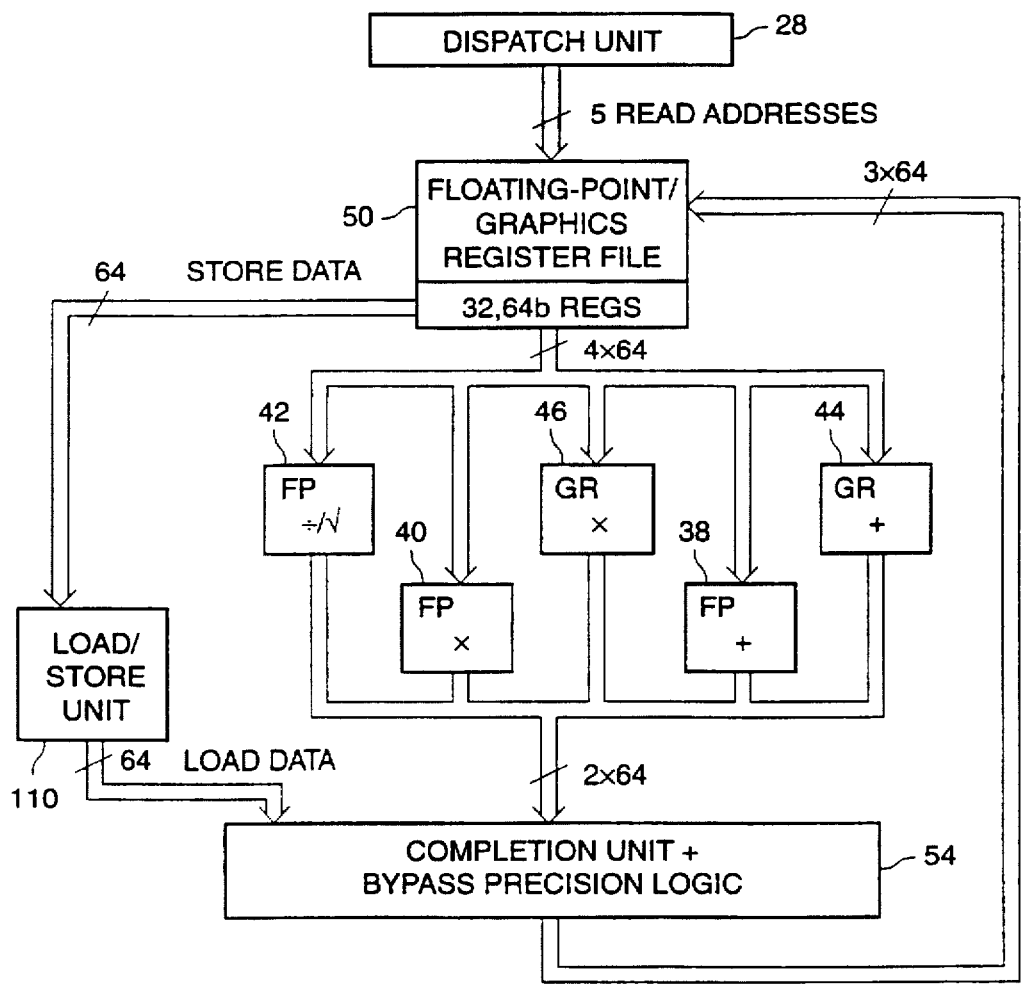
FIG. 6 is a block diagram of the floating point and graphics units of FIG. 1.

FIG. 6 illustrates the floating point and graphics functional units of FIG. 1, with the same load/store unit 88.

Figure 7:
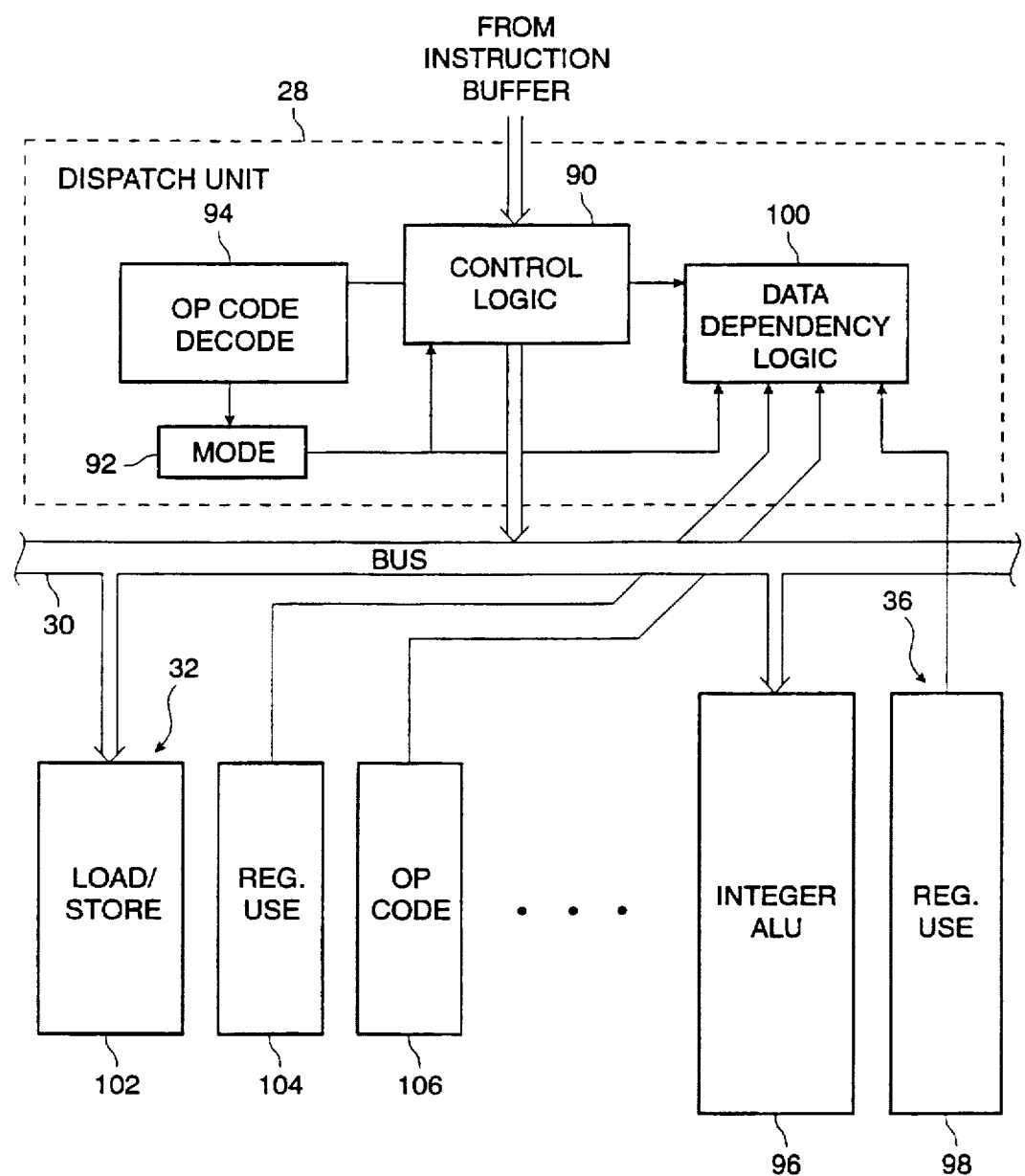
FIG. 7 is a block diagram of the dispatch unit of FIG. 1.

FIG. 7 is a block diagram showing the dispatch unit 28 of FIG. 1 in more detail. Control logic 90 determines which functional unit each instruction should be dispatched to, depending upon availability of the functional units and any other required resources. Two functional units are shown for illustrative purposes, load/store unit 32 and integer ALU functional unit 36. Before dispatching instructions to a first group of functional units (all functional units except for the load/store units), control logic 90 checks the precision mode in register 92. If the instructions to be dispatched have the same precision as those in the pipeline, as indicated by the mode bit in register 92, the instructions will be dispatched, with data dependencies being checked assuming register designations are all the same precision. Otherwise, the instructions will be stalled until the pipeline is empty, as indicated by an empty bit in mode register 92.

If an instruction is intended for load/store unit 32, then it is allowed to proceed regardless of whether its precision matches that of preceding instructions in the load/store pipeline. The control logic will not modify the mode bit on the basis of instructions in or provided to load/store unit 32, and checks the precision of register designations when checking data dependencies for providing instructions to the load/store functional unit.

The mode bit is set by an OP code decode logic block 94. Logic 94 decodes each instruction's OP code to determine whether it is single or double precision, and sets mode bit 92 accordingly when the instruction is dispatched into the pipeline.

In the illustrative diagram, integer ALU 36 is shown as a first block 96 including the actual functional logic, and a narrower block 98, which is the register designation carried along through the pipeline. The register designations are provided back to data dependency logic 100 and functional unit 28. There, data dependency logic 100 can compare the registers designated by new instructions to be dispatched by control logic 90 to the register designations in the pipeline as indicated by logic 98. Similar logic would be included for each of the other functional units and provided to data dependency logic 100. As can be seen, this logic is fairly simple, since there is no need to provide the OP code for each stage of the pipeline of the functional units. Data dependency logic 100 simply assumes that the register designation of the new and existing instructions are of the same precision.

In the load/store functional unit 32, on the other hand, there is provided the actual functional logic indicated by block 102, the register usage logic 104, and an additional OP code logic 106. OP code logic 106 indicates to data dependency logic 100 whether the instructions in each stage of the load/store functional unit pipeline are single or double precision. The data dependency logic includes an additional set of logic for using this information to determine data dependencies for a new instruction about to be dispatched by control logic 90.

As can be seen, the present invention thus provides the savings of not requiring logic 106 for each of the functional units, and also not requiring corresponding logic and data dependency logic 100 for each of the functional units. Instead, this is only required for the load/store functional units.

In addition, referring back to FIGS. 5 and 6, bypass precision logic 52 of FIG. 5 and 54 of FIG. 6 is used for the load/store units 32 of FIG. 5 and 110 of FIG. 6 to determine whether a bypassing of the completion unit should be allowed where there is a mixture of single and double precision numbers. The other functional units eliminate this logic, allowing a bypass regardless of whether the bypass instruction is a different precision from the other instructions in the pipeline. Since the pipeline will not be allowed to have instructions of different precision, this condition will never occur, thus eliminating the need for this additional checking logic.

Figure 8:
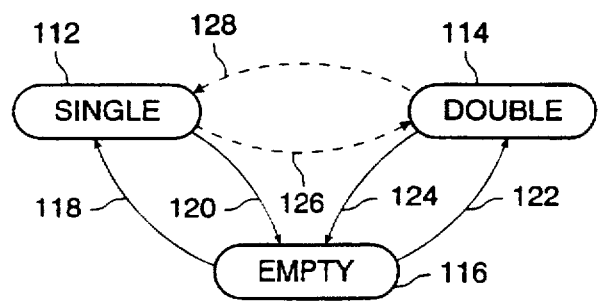
FIG. 8 is a state diagram illustrating the precision mode indicator states.

FIG. 8 is a state diagram illustrating the three states of the precision indicator of the present invention. In a first, single state 112, single precision operands are present in the pipeline. In a second, double precision state 114, double precision operands are present in the pipeline. In an empty state 116, the pipeline is empty of active and valid instructions.

Starting at empty state 116, upon a single precision instruction being dispatched, the state of the machine will transition as indicated by line 118 to the single precision state 112. As soon as the last single precision instruction has flowed through the pipeline, there will be a transition back to the empty state as indicated by arrow 120. Similarly, for double precision, a double precision instruction being dispatched will transition the state from empty state 116 as indicated by arrow 122 to double precision state 114. When the last double precision operand has exited the pipeline, there will be a transition back to empty state 116 as indicated by arrow 124.

Alternately, there may be a transition from a single to double precision state as indicated by arrow 126, or the reverse as indicated by arrow 128. These are indicated as dotted lines to show that they are optional. A direct transition would require logic to confirm that the instructions in the pipeline will complete in the next cycle so that there would not interference. Since this requires additional logic and would take additional time, it would be simpler to simply require that the pipeline be empty. Since transitions from single to double precision rarely occur, i.e., changing from one program to another might cause such an occurrence, the impact on throughput is negligible.

In indicating an empty state, the pipeline need not actually be empty of instructions. For example, in the case of a mispredicted branch, the instructions in the pipeline may simply be invalidated, rather than waiting for the multiple cycles required to physically empty the pipeline of the mispredicted instructions and start the new, corrected branch of instructions.

The load pipeline is an exception to the general rule that single and double precision rarely mix. It is possible, for instance, to load a single precision operand to register F0, another single precision operand to register F1, and then do a double precision operation using F0, which is the combination of F0 and F1. Fortunately, the load/save pipeline is shorter than the other pipelines, thus allowing much simpler logic to determine the operand and whether it is single or double precision.

When a change in a precision occurs, dispatching of instructions to the pipeline is halted until the pipeline empties. For example, in the Ultrasparc™ microprocessor, this would normally be seven cycles or less, unless there is a floating point square root or divide operation, which could take as much as 22 cycles, for instance. However, the probability of a switch in precision at the same time as a 22-cycle operation being processed is so remote that simply waiting for the 22 cycles to complete is not a significant performance factor.

Although the foregoing description refers to single and double precision, the present invention is applicable to quad precision or other precision levels with varying amounts of bits. In one embodiment, a quad precision operation would require a trap to software. In a preferred embodiment, any trap to software results in waiting for the pipeline to empty, thus dealing with the requirement of having the same precision in the pipeline at one time. Accordingly, a software emulation of a quad precision operation which waits for the pipeline to flush upon a software trap also does not need the logic which has been eliminated by the present invention, and can assume register designations are for the same precision.

As will be understood by those with skill in the art, the present invention may be embodied in other specific forms without departing from the spirit or essential characters thereof. For example, different numbers of functional units, different numbers of pipeline stages, and different numbers of bits for varying precisions could be used for the present invention. Accordingly, the above embodiments are intended to be illustrative, but not limiting, of the scope of the invention, which is set forth in the following claims.

What is claimed is:

1. A microprocessor comprising:

a plurality of pipelined functional units configured to process instructions;

a dispatch unit configured to dispatch instructions to said functional units;

a precision mode indicator memory associated with a first group of at least one of said functional units; and setting logic configured to set said precision mode indicator memory to a single-precision indication when a single precision instruction is dispatched to said first group of functional units and to set said precision mode indicator memory to a multiple-precision indication when a multiple-precision instruction is dispatched to said first group of functional units;

wherein said multiple-precision instruction is a quad-precision instruction.

2. A microprocessor comprising:

a plurality of pipelined functional units configured to process instructions;

a dispatch unit configured to dispatch instructions to said functional units;

a precision mode indicator memory associated with a first group of at least one of said functional units;

a comparator configured to compare a precision of a new instruction to be dispatched to a precision indicated by said precision mode indicator memory; and stalling logic configured to stall said new instruction when said new instruction has a precision which does not match the precision indicated by said precision mode indicator memory.

3. The microprocessor of claim 2 further comprising:

setting logic configured to set said precision mode indicator memory to a single-precision indication when a single precision instruction is dispatched to said first group of functional units and to set said precision mode indicator memory to a multiple-precision indication when a multiple-precision instruction is dispatched to said first group of functional units.

4. The microprocessor of claim 3 wherein said multiple-precision instruction is a double-precision instruction.

5. The microprocessor of claim 2 further comprising a register file having a plurality of entries, each of said entries storing either a multiple precision operand or a plurality of single precision operands.

6. The microprocessor of claim 2 further comprising:

a completion unit at the end of at least one of said functional units; and bypass logic configured to bypass said completion unit by using data from said first group of functional units without checking the precision of data being provided to said completion unit.

7. A microprocessor comprising:

a plurality of pipelined functional units configured to process instructions;

a dispatch unit configured to dispatch instructions to said functional units; and a precision mode indicator memory associated with a first group of at least one of said functional units;

wherein said dispatch unit further comprises:

check logic configured to check data dependencies by comparing register designations of a new instruction to be dispatched to register designations of instructions in said first group of functional units, without considering whether said register designations are for single or multiple precision data.

8. A microprocessor comprising:
a plurality of pipelined functional units configured to process instructions;
a dispatch unit configured to dispatch instructions to said functional units; and
a precision mode indicator memory associated with a first group of at least one of said functional units;
wherein said precision mode indicator memory comprises a 2 bit register, a first bit indicating either single or double precision, and a second bit indicating that said first group of functional units is empty of active and valid instructions.

9. A microprocessor comprising:
a plurality of pipelined functional units configured to process instructions;
a dispatch unit configured to dispatch instructions to said functional units;
a precision mode indicator memory associated with a first group of at least one of said functional units;
a second group of at least one of said functional units; and
dependency logic configured to determine data dependencies for instructions to be dispatched to said second group of functional units by analyzing whether register designations overlap between single and multiple precision instructions.

10. The microprocessor of claim 9 wherein said second group of functional units comprises a load and store functional unit.

11. A microprocessor comprising:
a plurality of pipelined functional units configured to process instructions;
a dispatch unit configured to dispatch instructions to said functional units;
a precision mode indicator memory associated with a first group of at least one of said functional units;
setting logic configured to set said precision mode indicator memory to a single-precision indication when a single precision instruction is dispatched to said first group of functional units and to set said precision mode indicator memory to a multiple-precision indication when a multiple-precision instruction is dispatched to said first group of functional units;
a comparator configured to compare a precision of a new instruction to be dispatched to a precision indicated by said precision mode indicator memory;
stalling logic configured to stall said new instruction when said new instruction has a precision which does not match the precision indicated by said precision mode indicator memory;
a register file having a plurality of entries, each of said entries storing either a multiple precision operand or a plurality of single precision operands; and
check logic configured to check data dependencies by comparing register designations in said register file of a new instruction to be dispatched to register designations of instructions in said first group of functional units, without considering whether said register designations are for single or multiple precision data.

12. The microprocessor of claim 11 wherein said precision mode indicator memory comprises a 2 bit register, a first bit indicating either single or double precision, and a second bit indicating that said first group of functional units is empty of active and valid instructions.

13. A microprocessor comprising:
a plurality of pipelined functional units configured to process instructions;
a dispatch unit configured to dispatch instructions to said functional units;
a precision mode indicator memory associated with a first group of at least one of said functional units;
setting logic configured to set said precision mode indicator memory to a single-precision indication when a single precision instruction is dispatched to said first group of functional units and to set said precision mode indicator memory to a multiple-precision indication when a multiple-precision instruction is dispatched to said first group of functional units;
a comparator configured to compare a precision of a new instruction to be dispatched to a precision indicated by said precision mode indicator memory;
stalling logic configured to stall said new instruction when said new instruction has a precision which does not match the precision indicated by said precision mode indicator memory;
a register file having a plurality of entries, each of said entries storing either a multiple precision operand or a plurality of single precision operands;
check logic configured to check data dependencies by comparing register designations in said register file of a new instruction to be dispatched to register designations of instructions in said first group of functional units, without considering whether said register designations are for single or multiple precision data;
a second group of at least one of said functional units; and
dependency logic configured to determine data dependencies for instructions to be despatched to said second group of functional units by analyzing whether register designations overlap between single and multiple precision instructions.

14. A method for operating a microprocessor comprising the steps of:
processing instructions in a plurality of pipelined functional units;
dispatching instructions to said functional units;
setting a precision mode indicator memory associated with a first group of at least one of said functional units;
comparing a precision of a new instruction to be dispatched to a precision indicated by said precision mode indicator memory; and
stalling said new instruction when said new instruction has a precision which does not match the precision indicated by said precision mode indicator memory.

15. The method of claim 14 further comprising the steps of:
setting said precision mode indicator memory to a single-precision indication when a single precision instruction is dispatched to said first group of functional units and setting said precision mode indicator memory to a multiple-precision indication when a multiple-precision instruction is dispatched to said first group of functional units.

16. The method of claim 15 wherein said multiple-precision instruction is a double-precision instruction.

17. The method of claim 15 wherein said multiple-precision instruction is a quad-precision instruction.

18. A method for operating a microprocessor comprising the steps of:
processing instructions in a plurality of pipelined functional units;

dispatching instructions to said functional units;

setting a precision mode indicator memory associated with a first group of at least one of said functional units; and checking data dependencies by comparing register designations of a new instruction to be dispatched to register designations of instructions in said first group of functional units, without considering whether said register designations are for single or multiple precision data.

19. A computer system comprising:

a memory;

a microprocessor coupled to said memory, said microprocessor including a plurality of pipelined functional units configured to process instructions, a dispatch unit configured to dispatch instructions to said functional units, a precision mode indicator memory associated with a first group of at least one of said functional units;

a comparator configured to compare a precision of a new instruction to be dispatched to a precision indicated by said precision mode indicator memory; and stalling logic configured to stall said new instruction when said new instruction has a precision which does not match the precision indicted by said precision mode indicator memory.

* * * * *